US007143310B2

(12) United States Patent
Gavish et al.

(10) Patent No.: US 7,143,310 B2
(45) Date of Patent: Nov. 28, 2006

(54) GENERATING STANDALONE MIDLETS FROM A TESTING HARNESS

(75) Inventors: Yael Gavish, Zichron Yaakov (IL); Gal Eshel, Tel Aviv (IL); Michal Geva, Kiryat Ono (IL); Eran Davidov, Nahariya (IL)

(73) Assignee: Sun Microsystems Inc., Palo Alto, CA (US)

( * ) Notice: Subject to any disclaimer, the term of this patent is extended or adjusted under 35 U.S.C. 154(b) by 609 days.

(21) Appl. No.: 10/347,748

(22) Filed: Jan. 22, 2003

(65) Prior Publication Data

US 2004/0153774 A1    Aug. 5, 2004

(51) Int. Cl.
*G06F 11/00*    (2006.01)

(52) U.S. Cl. ....................................................... 714/25
(58) Field of Classification Search .................. 714/25, 714/27, 33, 38; 717/124, 125, 135; 712/227; 702/119, 120
See application file for complete search history.

(56) References Cited

U.S. PATENT DOCUMENTS

| | | | | |
|---|---|---|---|---|
| 5,922,079 | A * | 7/1999 | Booth et al. | .................... 714/26 |
| 6,002,868 | A * | 12/1999 | Jenkins et al. | ............... 717/105 |
| 6,167,352 | A * | 12/2000 | Kanevsky et al. | ............ 702/81 |
| 6,378,088 | B1 * | 4/2002 | Mongan | ....................... 714/39 |
| 6,385,741 | B1 * | 5/2002 | Nakamura | .................... 714/38 |
| 6,449,731 | B1 * | 9/2002 | Frey, Jr. | ......................... 714/9 |
| 6,560,721 | B1 * | 5/2003 | Boardman et al. | ............. 714/33 |
| 6,708,324 | B1 * | 3/2004 | Solloway et al. | ............ 717/124 |
| 6,839,647 | B1 * | 1/2005 | Volkov et al. | ............... 702/119 |
| 6,847,916 | B1 * | 1/2005 | Ying | ........................... 702/183 |

OTHER PUBLICATIONS

Mobile Information Device Profile (JSR-37), JCP Specification, Java 2 Platform, Micro Edition, 1.0a (Sun Microsystems Inc.)., Palo Alto, California, Dec. 2000.

* cited by examiner

*Primary Examiner*—Robert Beausoliel
*Assistant Examiner*—Amine Reid
(74) *Attorney, Agent, or Firm*—Hoffman, Wasson & Gitler, PC

(57) ABSTRACT

A testing harness for a design-under-test is modified to include a standalone implementation of an application programming interface used in developing the design-under-test. The standalone implementation is adapted to a target device, and is packaged with an executable application or MIDlet, together with any needed resource files. Either the package, or optionally a JAR and JAD file, is downloaded to a remote user for execution on the target device. Using the application programming interface and the other downloaded files, the remote user can test the target device, analyze the results, and even modify the test conditions without recourse to the testing harness. The arrangement provides a capability for a party who is not privileged to know details of the testing harness to practically evaluate and modify the design-under-test using a standalone testing application.

58 Claims, 7 Drawing Sheets

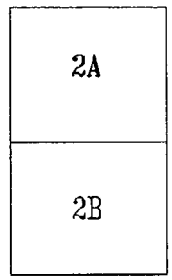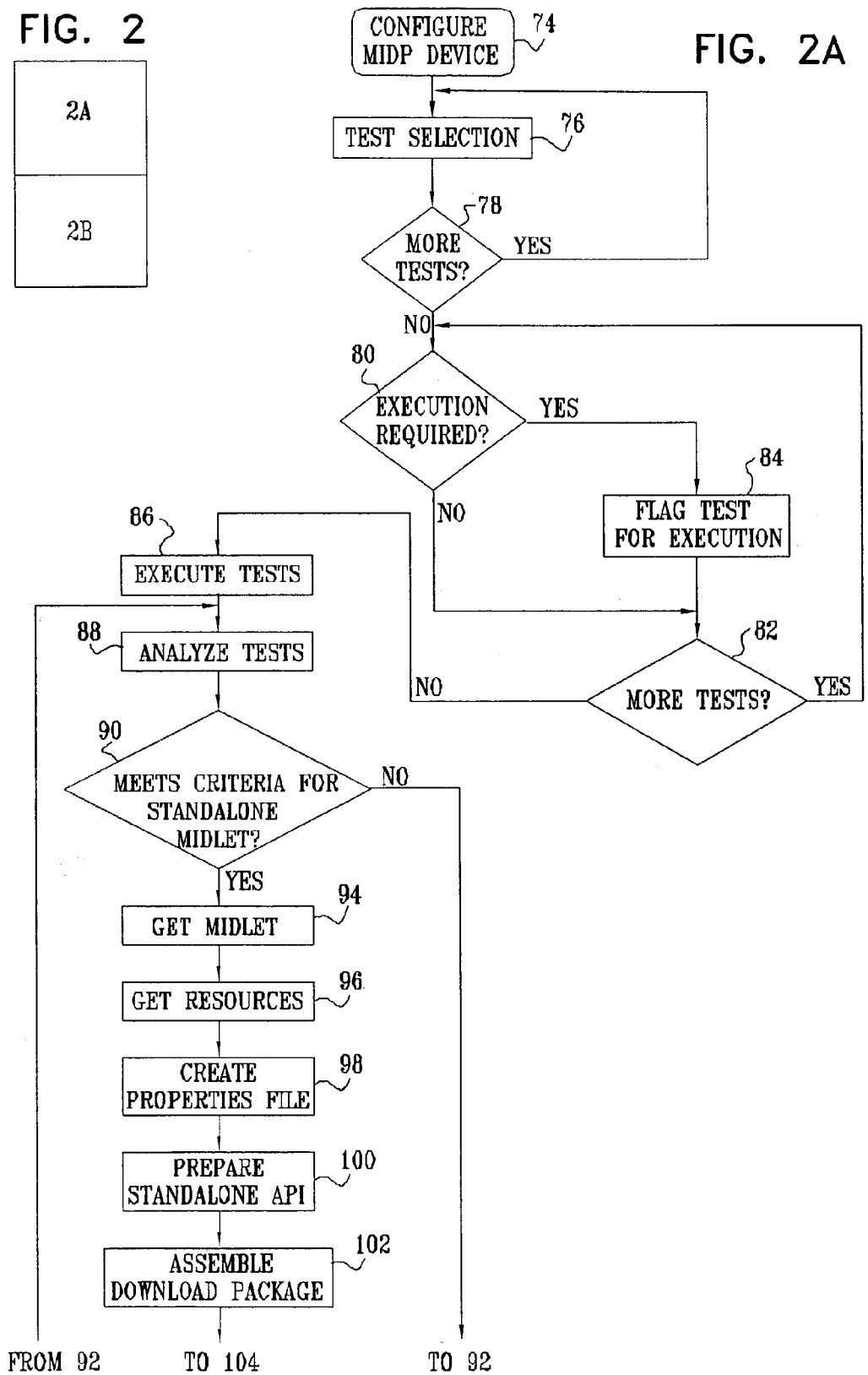

FIG. 4

| | RUNNER |
|---|---|

- 128 — showTestDescription: (java.lang.String descriptionFile, /130
  java.langString[] buttons)
- 132 — getAgentProperty(java.lang.String key) /136
- 134 — verbose(java.lang.String message, int verboseLevel)
- 140 — getProperty(java.lang.String key)
- 144 — getRunner() /142 /148
- 146 — setAgentManager(com.sun.TestBeans.Agent.AgentManager am)
- 150 — setCurrentTest(com.sun.TestBeans.Agent.Test test)
- 154 — initialize()
- 156 — getRunnerExtender() /160 152
- 158 — isSelected(java.langString testCase) /164
- 162 — reportCaseTestResult(java.lang.String caseName,
  java.lang.String result) /166
- 168 — resumeTestExecution(java.lang.String testResult)
- 170 — setMode(int runnerMode) /172
- 174 — getMode()
- 176 — pause(int milliSeconds) /178 /182
- 180 — suspendTestExecution(long timeout,
  java.lang.String defaultResult)

GENERATING STANDALONE MIDLETS FROM A TESTING HARNESS

BACKGROUND OF THE INVENTION

1. Field of the Invention

This invention relates to improvements in software and hardware design verification. More particularly, this invention relates to the provision of a standalone verification procedure that can be executed and manipulated by a developer of a software or hardware design, in which the verification procedure was generated by a computer-implemented testing framework that is not available to the developer.

2. Description of the Related Art

The meanings of acronyms and certain terminology used herein are given in Table 1 and Table 2. The terms Sun, Sun Microsystems, Java, JavaCard, J2EE, J2ME, J2SE, and the Sun logo are trademarks or registered trademarks of Sun Microsystems, Inc., in the United States of America and other countries. All other company and product names may be trademarks of their respective companies.

TABLE 1

| | |
|---|---|
| CDC | Connected device configuration. An arrangement appropriate for 32-bit architectures requiring more than 2 MB of memory. An example of such a device is a Net TV box. |
| CLDC | Connected, limited device configuration. CLDC is suitable for devices with 16/32-bit RISC/CISC microprocessors/controllers, having as little as 160 KB of total memory available. |
| J2EE | Java 2 Enterprise Edition |
| J2ME | Java 2 Micro Edition |
| J2SE | Java 2 Standard Edition |
| JavaCard | A Java-based technology that enables Java applications to run on smart cards and other devices with limited memory. |

TABLE 2

| | |
|---|---|
| API | Application programming interface |
| JAD | Java application descriptor |
| JAR | Java archive |
| MIDlet | A MIDP application |
| MIDP | Mobile information device profile. A set of Java APIs which, together with the CLDC, provides a complete J2ME application runtime environment targeted at mobile information devices. |

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances.

In general, test systems produce a report indicating whether tests have been passed or failed, and, in some cases may even indicate a module that is estimated to be faulty. Where the designer has himself constructed the test generator system, adjustment of the test engine and further analysis of design flaws may be possible. However, in other cases the testing framework and the design are controlled by different parties. For example, the designer may employ the services of a commercial design-testing agency that offers its services to the public. In such cases, proprietary considerations may limit the ability of the testing agency to make details of its test system available to the designer. Consequently, the designer, while aware of a design flaw, may be frustrated in evaluating its root causes, as the report received from the testing agency provides insufficient information.

A specification known as the Mobile Information Device Profile (MIDP) defines a set of Java application programming interfaces that provide an application runtime environment for mobile information devices, such as mobile telephones. The Mobile Information Device Profile is defined in the document, Mobile Information Device Profile (JSR-37), JCP Specification, Java 2 Platform, Micro Edition, 1.0a (Sun Microsystems Inc., Santa Clara, Calif., December 2000).

The Mobile Information Device Profile builds on the Connected Limited Device Configuration (CLDC) of the Java 2 Platform, Micro Edition (J2ME) (available from Sun Microsystems Inc., Santa Clara, Calif.). CLDC and J2ME specifically address the devices used in the vast market, which covers mobile information devices ranging from small devices, such as smart cards or pagers, to powerful set-top boxes. CLDC technology includes a virtual machine, which is a small Java virtual machine that is adapted to the constraints of small mobile information devices. MIDP applications that use the MIDP and CLDC APIs are known as MIDlets.

Mobile information devices are currently a fertile source of new designs. Both the devices themselves and their MIDlets require thorough design verification before release to the purchasing public. The present invention focuses principally on design verification of devices.

SUMMARY OF THE INVENTION

The present invention provides a computer-implemented testing framework for computing devices, particularly mobile information devices, and for software designed to run on such devices. A developer submits a computing product under development, typically a computing device or software that is designed to run on the device, for evaluation by a testing and verification center. The center runs a selected battery of test programs on the product while monitoring its behavior, using a general-purpose test facility available at the center for this purpose.

When the test facility discovers a fault in the product, evidenced by failure to exhibit the expected behavior under one of the test programs, it generates a standalone version of the particular test program that the product failed. This standalone version is capable of running on the developer's computing device, independent of the general-purpose test facility. The center downloads the standalone test program to the developer, who can then run it on the computing device in order to observe the deviant behavior of the device or software under development. Such observation will generally lead the developer to a solution of the design flaw that led to the deviant behavior more readily than could be achieved by simply reading an abstract printout of test results.

The use of the generic testing framework according to the invention to generate standalone executable programs, such as MIDlets, provides a convenient and powerful tool for engineering teams, such as software quality engineering teams, to develop and execute test suites for design verification. The generic testing framework is also useful for performance measurements and stress testing of a design.

In general, the details regarding the structure and the operation of the generic testing framework and its intrinsic application programming interfaces are not visible to the designer of a design-under-test. Rather, from the point of view of the designer, the generic testing framework is simply a "black box" into which the design-under-test is submitted. The invention provides a capability for a remote user or a party who is not privileged to know details of the generic testing framework and its operations to nevertheless evaluate and modify the design-under-test using a standalone testing application. This capability is useful, for example, when the operator of the testing and verification center wishes to keep details of the testing framework and procedures proprietary, or when the level of complication of the general-purpose test facility and the resources that it requires are so great as to make it impractical to duplicate the facility at the developer's premises.

The invention provides a method for testing a computing product, which is carried out by running a battery of test programs in a test facility so as to simulate operation of the computing product, observing that a particular test program in the battery engenders behavior of interest during the simulated operation, and generating a standalone version of the particular test program, which is capable of running on the computing product independently of the test facility.

An additional aspect of the method includes downloading the standalone version to a development facility, and executing the particular test program on the computing product at the development facility using the standalone version.

According to one aspect of the method, executing the particular test program includes presenting an output of the particular test program using a display at the development facility.

According to another aspect of the method, the computing product is a mobile information device, and the display is integrally a part of the mobile information device.

Responsively to the output, the method is further carried out by establishing a modified test condition for the particular test program, and repeating execution of the particular test program using the modified test condition.

In one aspect of the method, the particular test program invokes functions of a development application programming interface. Generating the standalone version is carried out by providing a standalone implementation of the development application programming interface for use by the particular test program, and downloading the particular test program and the standalone implementation of the development application programming interface to the computing product, wherein the computing product is disposed at a second location.

In another aspect of the method, the particular test program includes a plurality of test cases, and the method is further carried out by preparing a properties file that specifies an order of execution of the test cases, downloading the properties file to the computing product, and executing the test cases on the computing product in the order of execution.

In still another aspect of the method, the particular test program includes a plurality of test cases, and the method is further carried out by encoding an order of execution of the test cases in the particular test program, and executing the test cases on the computing product in the order of execution.

In a further aspect of the method, following performance of executing the MIDlet and presenting results thereof, responsively to the results, the method is further carried out by establishing a modified test condition for the MIDlet, and repeating execution of the MIDlet using the modified test condition.

In yet another aspect of the method, the results are presented using the application programming interface.

In still another aspect of the method, following performance of executing the MIDlet and presenting results thereof, responsively to the results, the MIDlet is modified, and the MIDlet then re-executed.

The invention provides a computer software product, including a computer-readable medium in which computer program instructions are stored, which instructions, when read by a computer, cause the computer to perform a method for generating a standalone testing program for a design-under-test. The method is carried out at a first location by running at least a portion of a battery of test programs in a test harness linked to the computer so as to test operation of the design-under-test, the test programs invoking functions of a development application programming interface. The method is further carried out by selecting one of the test programs of the battery, assembling the selected test program as a MIDlet that is adapted to be executed on an information device, providing a standalone implementation of the application programming interface for the MIDlet, wherein the standalone application programming interface is an implementation of the development application programming interface and is adapted to the information device, and downloading the MIDlet and the standalone implementation of the application programming interface to the information device, the information device being disposed at a second location.

In one aspect of the computer software product, the selected test program includes a plurality of test cases, wherein the instructions further cause the computer to further carry out the method at the first location by preparing a properties file that specifies an order of execution of the test cases, and downloading the properties file to the device, wherein the standalone implementation of the application programming interface is adapted to cause the MIDlet to execute the test cases on the device in the order of execution.

In another aspect of the computer software product, following performance of executing the MIDlet, the application programming interface is adapted to cause the device to further carry out the method by displaying results thereof to a user, and responsively to an instruction from the user, establishing a modified test condition for the MIDlet, and repeating execution of the MIDlet using the modified test condition.

According to a further aspect of the computer software product, the application programming interface includes a class that controls an interaction of the MIDlet with a runtime environment thereof.

According to yet another aspect of the computer software product, the class includes a function that returns a description of the one of the test programs.

According to still another aspect of the computer software product, the class includes a function that returns properties of the runtime environment.

According to an additional aspect of the computer software product, the class includes a function for logging error information relating to the one of the test programs.

According to one aspect of the computer software product, the class includes a function that returns a specified property of the one of the test programs.

According to a further aspect of the computer software product, the class includes a function that registers results of a specified case of the one of the test programs.

According to yet another aspect of the computer software product, the class includes a function that suspends execution of the MIDlet for a specified interval.

According to still another aspect of the computer software product, the class includes a function that causes execution of the MIDlet to resume following suspension thereof.

According to one aspect of the computer software product, the class includes a function that returns a current execution mode of the class.

According to another aspect of the computer software product, the class includes a function that displays results of the one of the test programs.

The invention provides a data processing system for generating a standalone test program for an information device, wherein the test program invokes functions of a development application programming interface, the system including a computer readable memory that has a data structure stored therein. The data structure includes a standalone implementation of the application programming interface for executing the test program in a standalone mode of operation, wherein the standalone implementation of the application programming interface is an implementation of a development application programming interface that is adapted to enable the device to execute the test program in the standalone mode of operation, and to present test results to a user.

According to a further aspect of the data processing system, the standalone implementation of the application programming interface includes a class that controls an interaction of the test program with a runtime environment thereof.

According to yet another aspect of the data processing system, the class includes a function that returns a description of a test case of the test program.

According to still another aspect of the data processing system, the class includes a function that returns properties of the runtime environment.

According to an additional aspect of the data processing system, the class includes a function for logging error information relating to the test program.

According to one aspect of the data processing system, the class includes a function that returns a specified property of a test case of the test program.

Another aspect of the data processing system the test program includes a plurality of test cases, and the class includes a function that is invoked during performance of executing the test program, the function returning a status of a specified one of the test cases.

According to a further aspect of the data processing system, the test program includes a plurality of test cases, and the class includes a function that registers results of a specified one of the test cases.

According to yet another aspect of the data processing system, the class includes a function that suspends execution of the test program for a specified interval.

An additional aspect of the data processing system the class includes a function that causes execution of the test program to resume following a suspension thereof.

According to one aspect of the data processing system, the class includes a function that returns a current execution mode of the class.

According to another aspect of the data processing system, the class includes a function that displays results of the test program following execution thereof on the device.

The invention provides a computer-implemented test harness, including a first application programming interface, a test selection module that is accessible via the first application programming interface, a local test execution module for testing a design-under-test responsively to the test selection module, and an application generator adapted to generate an executable program for conducting selected tests on a remote device. The application generator is responsive to the first application programming interface. The selected tests are chosen responsively to results of the local test execution module, and the selected tests invoke functions of a development application programming interface. A persistent storage has a data structure resident therein, the data structure including a second implementation of the development application programming interface, the second implementation of the development application programming interface being an implementation of the development application programming interface that is adapted to the remote device. An order of test execution is obtained for at least one test procedure via the test selection module and the first application programming interface. The computer-implemented test harness further includes a packaging module, adapted to assemble the program and the data structure into a download package for transmission to the remote device. The download package is configured for standalone execution of the program on the remote device according to directions received from a user via the second implementation of the development application programming interface.

According to another aspect of the computer-implemented test harness, the local test execution module includes a simulation unit.

According to still another aspect of the computer-implemented test harness, the local test execution module includes a link to another remote device that is identical to the first remote device.

According to an additional aspect of the computer-implemented test harness, the design-under-test includes software adapted to execute on the remote device.

According to one aspect of the computer-implemented test harness, the design-under-test includes at least a portion of the remote device.

According to a further aspect of the computer-implemented test harness, the download package includes a JAR file.

According to yet another aspect of the computer-implemented test harness, the download package is a zip file.

Still another aspect of the computer-implemented test harness includes a server for a data network that is initially accessible by the remote device, the application generator and the persistent storage being disposed in the server.

According to an additional aspect of the computer-implemented test harness, the second implementation of the development application programming interface includes a class that controls an interaction of the program with a runtime environment thereof.

According to one aspect of the computer-implemented test harness, the class includes a function that returns a description of the test procedure.

According to another aspect of the computer-implemented test harness, the class includes a function that returns properties of the runtime environment.

According to a further aspect of the computer-implemented test harness, the class includes a function for logging error information relating to the test procedure.

According to yet another aspect of the computer-implemented test harness, the class includes a function that returns a specified property of the test procedure.

According to still another aspect of the computer-implemented test harness, the test procedure includes a plurality of cases, and the class includes a function that is invoked while executing the program on the remote device, the function returning a status of a specified one of the cases.

According to an additional aspect of the computer-implemented test harness, the class includes a function that registers results of a specified case of the test procedure.

According to one aspect of the computer-implemented test harness, the class includes a function that suspends execution of the program on the remote device for a specified interval.

According to a further aspect of the computer-implemented test harness, the class includes a function that causes a resumption of execution of the program on the remote device following a suspension thereof.

According to yet another aspect of the computer-implemented test harness, the class includes a function that returns a current execution mode of the class.

According to still another aspect of the computer-implemented test harness, the class includes a function that displays results of the test procedure.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 2A and FIG. 2B, collectively referred to herein as FIG. 2, are flow charts illustrating a method of generating standalone MIDlets using a testing harness which is operative in accordance with a disclosed embodiment of the invention;

FIG. 4 is a class diagram illustrating details of a class that is used in an application programming interface of the generic testing framework illustrated in FIG. 1 in accordance with a disclosed embodiment of the invention;

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Overview

Figure 1:
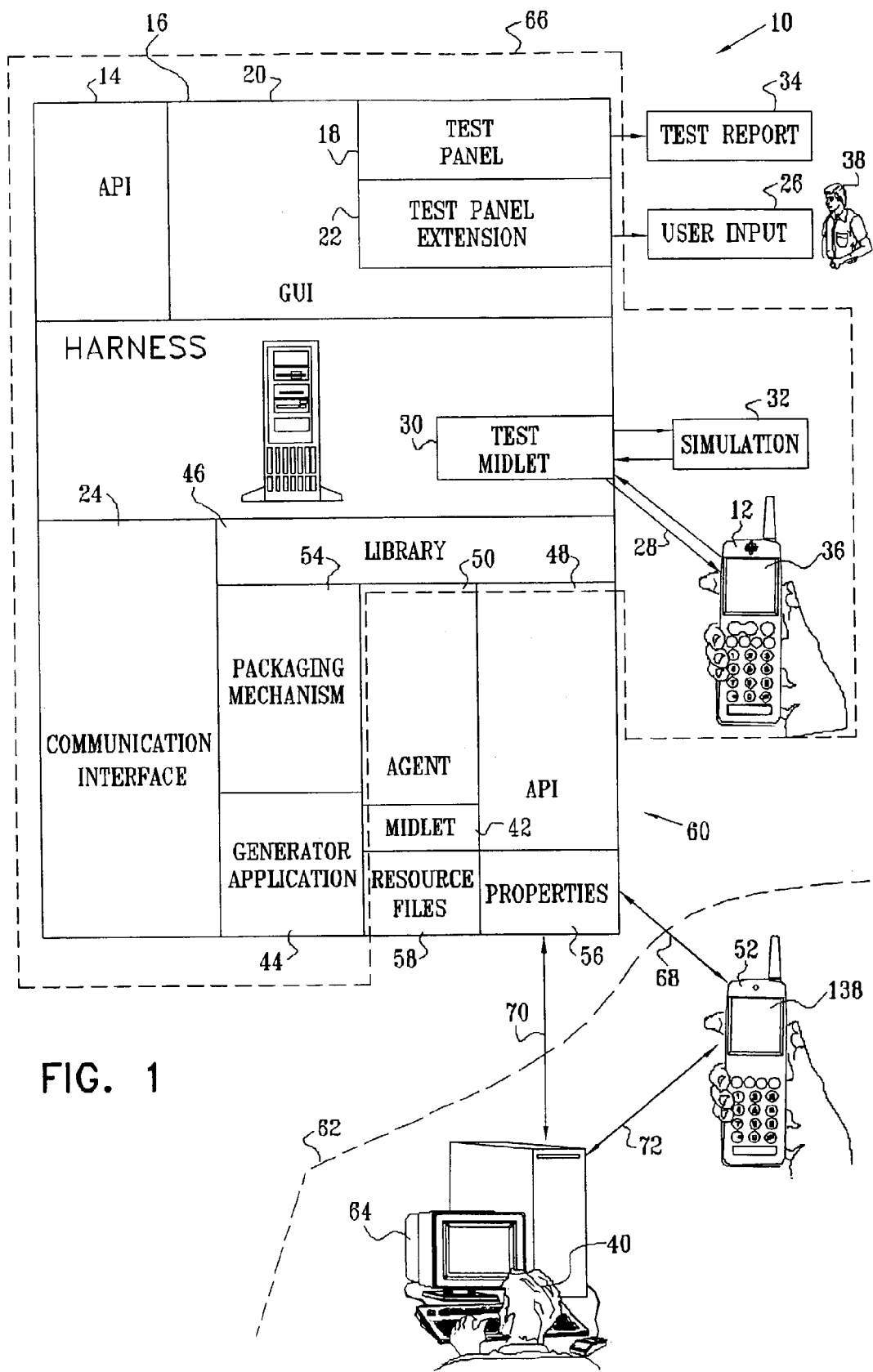
FIG. 1 is a high level block diagram illustrating a modified version of a generic testing framework, which is constructed and operative in accordance with a disclosed embodiment of the invention.

Reference is now made to FIG. 1, which is a high-level block diagram illustrating a generic testing framework 10, which is constructed and operative in connection with a disclosed embodiment of the invention. The testing framework 10 is typically used for evaluating the hardware or software of a mobile information device 12, but is not limited to such devices. The testing framework 10 typically includes a computer having conventional facilities, such as persistent storage for holding data objects as are disclosed in further detail hereinbelow. In different embodiments, the testing framework 10 can be employed to test designs written for different platforms in a standalone mode of operation, for example J2SE or J2EE. Indeed, applications written in any of the platforms listed in Table 1 can be tested with the testing framework 10. The teachings of the invention herein are not limited to the particular generic testing framework disclosed herein, but may be applied to other testing frameworks that are unrelated to the specific platforms listed in Table 1 by the application of ordinary skill in the art.

The testing framework 10 is provided with an application programming interface 14 together with a test harness 16, which can be executed in a general purpose computer. The test harness 16 has a test selection unit 18 that provides a battery of tests, which can be selected using a graphical user interface 20 (GUI) of the testing framework 10, using the application programming interface 14. A test panel extension 22 of the graphical user interface 20 accommodates certain specialized functions of the testing framework 10 relating to standalone MIDlets. The test panel extension 22 is disclosed in further detail hereinbelow. The application programming interface 14 provides for common tasks, such as running and stopping tests, and communicating with other elements of the test harness 16. The testing framework 10 includes a communications interface 24, and is capable of external communication.

The tests that are available from the test selection unit 18 can be influenced by submission of test conditions and parameters via a user input 26, for example the directory in which the test's source files are located, or a web server used for networking requirements. Typically, the user input 26 is realized as an input screen of the application programming interface 14.

In some applications, particularly when hardware is being tested, the test harness 16 is physically connected to the mobile information device 12 during the test procedures over links 28. In some applications in which wireless devices are tested, it may be desirable that the links 28 be wireless. Alternatively or additionally, the test harness 16 may operate in a simulation mode, wherein a test MIDlet 30 executes and accepts program input and produces simulated output using a simulation unit 32. This mode is typically employed when software for the mobile information device 12 is being tested. However, the simulation unit 32 may also be used to simulate the hardware. Typically, a battery of tests, selected using the test selection unit 18, is executed using the test harness 16 linked to either the mobile information device 12 or the simulation unit 32.

The results of the tests are typically transmitted from the mobile information device 12 to the test harness 16 via the communications interface 24 over the links 28. A report 34 of test results is provided by the test harness 16. In some cases, it may be possible to view the test results directly on a display 36 of the mobile information device 12.

Analysis of the battery of tests is then conducted. With the aid of the report 34, an operator 38 of the test harness 16 can determine whether a design-under-test-does not pass a particular test, or that the test yields suspect results. A decision may then be made to provide the particular test for standalone execution to a remote user 40, who is typically a developer of hardware or software for the mobile information device 12. Of course, more than one test of the battery may fail, in which case the following procedure is repeated. It should be noted that many different tests can be generated for standalone execution, not merely those that fail. For example, it may be desired to rerun a test that was previously executed successfully in standalone mode after making a modification of the design-under-test.

In order to generate the standalone test program, the test harness 16, upon receipt of a suitable command via the application programming interface 14 of the testing framework 10, is responsible for generating a test MIDlet 42, or in some cases, retrieving it from storage. The communications interface 24 can be remotely accessible over a data network, such as the Internet. In any case, the testing framework 10 is provided with a suitable generator application 44 for generating the MIDlet 42, and generally has a run-time support library 46, which is used by the generator application 44. The software components disclosed in copending, commonly assigned Application No. (STC File. No. 45437), entitled "Extensible Framework for Code Generation from XML Tags," are suitable for the generator application 44 and the library 46.

Typically the program under test, both in its version as the test MIDlet 30 and in its standalone version, the MIDlet 42, was originally developed by an outside developer prior to submission to the testing framework 10, using a development application programming interface, typically in a remote physical location (not shown). The testing framework 10 additionally provides a standalone agent 50, which has an application programming interface implementation 48. The application programming interface implementation 48 is an implementation of the development application programming interface that implements those functions of the development application programming interface that are necessary to execute the MIDlet 42 in the environment of a remote mobile information device 52 as a standalone application. A specialized packaging mechanism 54 is also included in the testing framework 10. Using the packaging mechanism 54, the standalone agent 50 is packaged with the MIDlet 42 a properties file 56, and other resource files 58 as a download package 60. The properties file 56, typically included in the JAR file, is disclosed in further detail hereinbelow. The resource files 58 can include graphics, other media files, test class files, and other resources that may be required to execute the MIDlet 42 in a standalone mode.

If it is determined by the operator 38 that a test has uncovered a design flaw or is otherwise of interest, then the package 60 is downloaded or otherwise transferred to the user 40 who submitted the design-under-test for testing by the testing framework 10. The physical separation of the user 40 from the testing framework 10 is indicated by a dashed line 62. The user 40 typically maintains the mobile information device 52, which is identical to the mobile information device 12. The user 40 may also operate other computing facilities 64, which can also accept downloads via the communications interface 24. It is to be emphasized that most aspects of the testing framework 10 are not exposed to the user 40. In particular, the software of the testing framework 10 is unavailable to the user 40, either intentionally for reasons of secrecy, or because it is inconvenient or difficult to set up. In practice, the interaction of the user 40 with the testing framework 10 is essentially limited to submission of a portion of the user input 26, and receipt of the report 34. In a setting in which the testing framework 10 is controlled by a party other than the user 40, the ability of the user 40 to interactively vary the user input 26 and to modify the generation of the MIDlet 42 is somewhat limited. In a current implementation, the test input is taken from the properties file 56, which can be prepared, at least in part by the user 40. In this way, the user 40 is able to vary the test input, just as can the operator 38 of the testing framework 10. In other implementations, this may not be the case. Those portions of the testing framework 10 that are not directly exposed to the user 40 are enclosed by a dotted line 66.

The communications interface 24 is accessible to the mobile information device 52 via a link 68, which can be a wireless link, and additionally or alternatively may involve the Internet. The communications interface 24 starts listening on a predetermined port for incoming requests for the MIDlet 42. The user 40 activates the mobile information device 52, and the link 68 so as to direct the mobile information device 52 to a URL that corresponds to the port on which the communications interface 24 is listening, and from which the MIDlet 42 can be downloaded.

The standalone agent 50 is downloaded as part of the package 60 with each test that is transferred over the link 68 to the MIDP environment of the mobile information device 52, which, as explained above, is controlled by the user 40, rather than the proprietor of the testing framework 10. The standalone agent 50 is totally independent of the testing framework 10 and its communications interface 24. In contrast, when testing the design-under-test using an analogous agent in the testing framework 10, such communication is required.

In other embodiments, the package 60 may be downloaded to the computing facilities 64 over a link 70, and the MIDlet 42 relayed by the computing facilities 64 to the mobile information device 52 via a link 72. After execution on the mobile information device 52, the user 40 can then analyze the test results, and can often adjust test conditions or parameters without use of the testing framework 10. It is to be emphasized that in such embodiments there is no reliance on communication between the testing framework 10 and the computing facilities 64 or the mobile information device 52 during execution of the MIDlet 42. The MIDlet 42 is a fully standalone application.

General Method of Operation

Figure 2B:
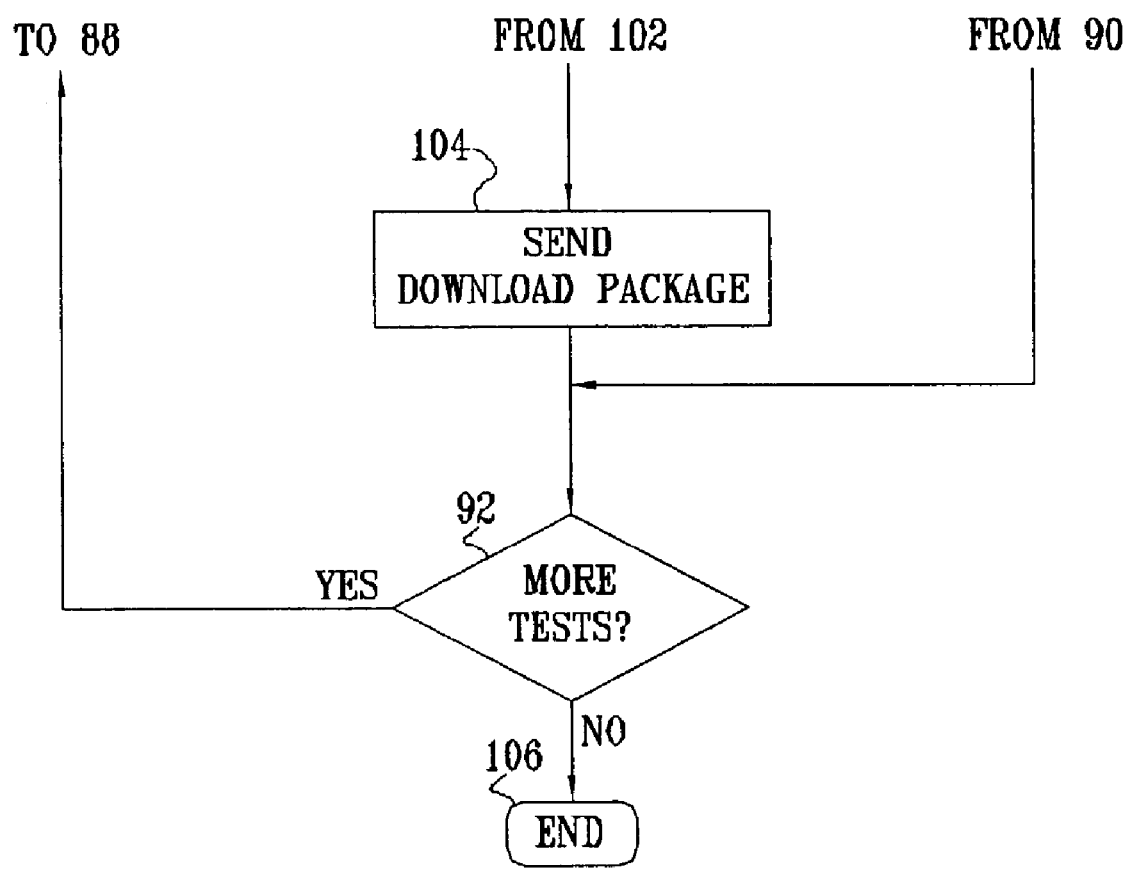

Reference is now made to FIG. 2, which is a flow chart illustrating a computer-implemented method of generating standalone MIDlets using a testing harness to evaluate a design-under-test that is operative in accordance with a disclosed embodiment of the invention. The sequence shown in FIG. 2 is exemplary, and the steps may be performed in different orders, so as to achieve an efficient implementation on a particular computer system. In initial step 74 a mobile information device situated at the site of the test harness is connected to the test harness, and is configured to execute a test MIDlet for purposes of testing the MIDlet or the device. In some applications, it may be desirable to represent the mobile information device in an emulator rather than test an actual mobile information device.

Next, at step 76, a member of a group of tests that are available in the generic testing framework is selected. In step 76, the operator of the test harness makes a determination whether a particular test of the group is suitable for testing the mobile information device. If so, the test is added to a list of tests that are intended to evaluate the mobile information device or software intended to run on the mobile information device.

Next, at decision step 78 a determination is made whether more tests from the group of tests remain to be evaluated. If the determination at decision step 78 is affirmative, then control returns to step 76.

If the determination at decision step 78 is negative, then control proceeds to decision step 80, where it is determined whether execution of a test from the group of tests is required. In some cases, a standalone MIDlet is generated regardless of the outcome of the test, and it may not be necessary to actually run the test.

If the determination at decision step 80 is negative, then control proceeds to decision step 82, which is disclosed below.

If the determination at decision step 80 is affirmative, then control proceeds to step 84, where the test evaluated in decision step 80 is flagged for execution. Control proceeds to decision step 82.

In decision step 82, it is determined if more tests need to be evaluated. If the determination at decision step 82 is affirmative, then control returns to decision step 80.

If the determination at decision step 82 is negative, then control proceeds to step 86.

At step 86 the selected tests that were flagged for execution in step 84 are actually run.

Next, at step 88, one of the tests from the battery is selected for result analysis.

Next, at decision step 90, a determination is made whether the test that was selected at step 88 revealed a flaw in the design-under-test, or has met other criteria for generation of a standalone MIDlet. In some implementations it may be required to generate a set of standalone MIDlets regardless of the outcome of the test in step 86. If the determination at decision step 90 is negative, then control proceeds to decision step 92, which is disclosed below.

If the determination at decision step 90 is affirmative, then control proceeds to step 94. A standalone MIDlet incorporating the failed test is generated or retrieved from storage.

Next, at step 96 other resource files necessary for the MIDlet generated in step 94 are assembled. These resources may include test class files, graphics, HTML files, and multi-media resources.

Next, at step 98 a properties file is produced. The properties file specifies the order in which the different cases of the test analyzed in step 88 are to be run. Other information necessary to execute the test cases in accordance with the intent of the user, for example test parameters, may be included in the properties file. The information in the properties file is implementation dependent. For example, the properties file may specify environment variables, such as the URL of a server used for networking tests.

Next, at step 100 a standalone agent that implements the application programming interface is associated with the properties file that was prepared in step 98, the resources that were assembled in step 96, and the MIDlet that was obtained in step 94. The user can repeat the test that was analyzed in step 88 by executing the MIDlet on the mobile information device without interaction with the generic testing framework.

Next, at step 102 archive files are collected into a download package. In some embodiments, the archive file may be further compressed prior to delivery to the mobile information device.

Control now proceeds to step 104. The download package that was assembled in step 102 is transmitted to a remote party.

At decision step 92 a determination is made whether there are more test results remaining to be analyzed. If the determination at decision step 92 is affirmative, then control returns to step 88.

If the determination at decision step 92 is negative, then control proceeds to final step 106, and the process ends.

Figure 3:
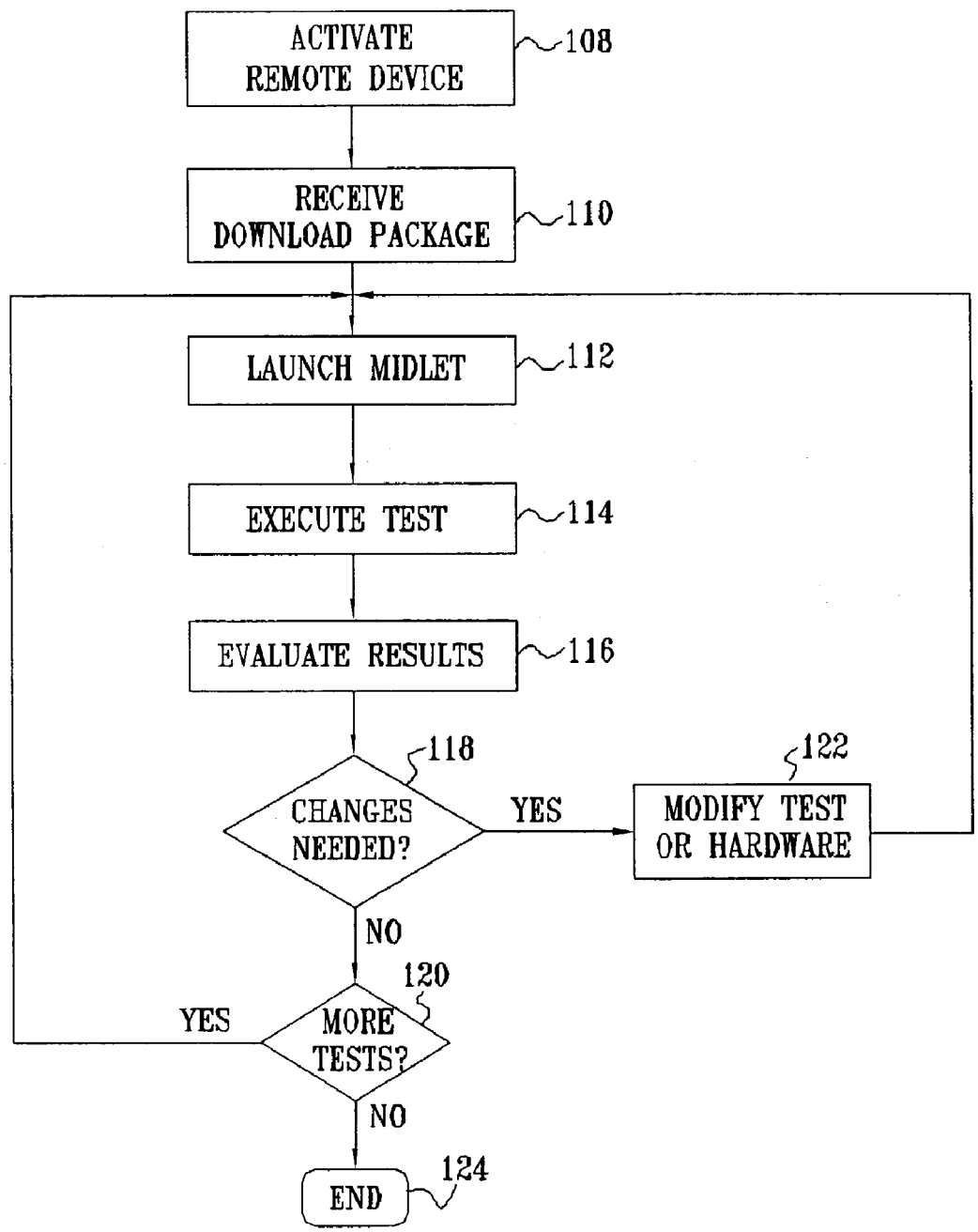
FIG. 3 is a flow chart illustrating a method of using a standalone MIDlet that was prepared using the method illustrated in FIG. 2 at a remote site in accordance with a disclosed embodiment of the invention.

Reference is now made to FIG. 3, which is a flow chart illustrating a method of processing the download package that was transmitted in step 104 (FIG. 2) by a remote party, such as a developer. The description of FIG. 3 should be read in conjunction with FIG. 2. The process begins at initial step 108. Here the remote party prepares a device for receiving the download package. The device can be the mobile information device for which the download package is adapted, or it can be a separate computer facility that can relay the download package to the target mobile information device, or in some applications, execute the downloaded MIDlet using simulation. Then, at step 110, the download package is received and installed on the mobile information device.

Next, at step 112 the MIDlet that was included in the download of step 110 is activated on the mobile information device using the standard mechanism for activation of MIDlets on the device.

Next, at step 114, the cases of the test analyzed in step 88 (FIG. 2) are executed in the order specified in the properties file that was prepared in step 98. Alternatively, the order of test execution may be determined by the user, or specified in the test code. Results are accumulated and organized.

Next, at step 116 the test results are presented to the remote party, generally on a display of the mobile information device. In some cases, the mobile information device can be emulated by a computing facility operated by the remote party. In any case, the results need not be uploaded to the generic testing framework.

Control now proceeds to decision step 118, where a determination is made whether the test requires modification. If the determination at decision step 118 is negative, then control proceeds to decision step 120. If the determination at decision step 118 is affirmative, then control proceeds to step 122, which is disclosed below.

At decision step 120 a determination is made whether more test cases remain to be evaluated. This is done with reference to the properties file that was prepared in step 98 (FIG. 2). If the determination at decision step 120 is affirmative, then control returns to step 112.

If the determination at decision step 120 is negative, then control proceeds to final step 124, and the process ends.

Step 122 is performed if the determination at decision step 118 is negative. Here, using the standalone application programming interface, the user appropriately modifies test parameters, or changes the order of the test cases. In various implementations, these modifications can be either modifications of the test source code, such as Java source files, or modifications of the properties file. If the test framework allows changes in the order of tests within a particular MIDlet, the user may be able to conveniently change the test order by editing the properties file. But in situations where the user cannot change the test order, for example, because it is determined in the source code, then he would have to edit the source code in order to change the test order. Alternatively or additionally, the user may modify the hardware under test. Modification of the software is also possible in those embodiments in which appropriate source code is included in the archive file. Control then returns to step 112 and the standalone MIDlet is rerun in order to determine whether the modification has rectified the problem that previously caused the test failure.

API Implementations

Reference is now made to FIG. 4, which is a class diagram illustrating details of a class Runner 126. The description of FIG. 4 should be read in conjunction with FIG. 1. The application programming interface implementation 48 (FIG. 1) includes the class Runner 126, which is an API class that is provided for the use of the test writer. The class Runner 126 is a feature of the particular embodiment disclosed herein, and it is possible to practice the invention by providing the functionality of the class Runner 126 in different ways, as are known in the art of software development. The class Runner 126 handles the test's interaction with its run-time environment, and is responsible for controlling test execution, for example dealing with pause and resume events. The class Runner is also responsible for generating information, such as debug information, and reports. The methods of the class Runner 126 that are invoked by the test MIDlet 30 (FIG. 1) when testing is conducted using the test harness 16 sometimes differ in their implementations from corresponding methods that are invoked by the MIDlet 42, because the standalone agent 50 operates under different constraints and conditions in standalone mode than the test harness 16. These differences are disclosed in further detail hereinbelow. The methods of the class Runner 126 are modifiable according to the requirements of a particular test harness.

Among the functions or methods provided in the class Runner 126 is a method showTestDescription( ) 128, which returns a description of a current test. This is necessary when the test is interactive, as the tester must be informed how to run the test and what results to expect. A HTML file specified by a parameter descriptionFile 130 contains the description and instructions for running each interactive test.

When invoked by the test MIDlet 30 operating within the testing framework 10 (FIG. 1) the method showTestDescription( ) 128 is implemented such that a connection is opened to the communications interface 24. A request is then submitted by an agent executing on the mobile information device 12 to the test harness 16 for the file specified by the parameter descriptionFile 130 to be displayed. The test harness 16 opens a separate window on a display (not shown) in which to actually display the file. This version of the method showTestDescription( ) 128 is represented by the pseudocode fragment of Listing 1.

Listing 1

```
public void showTestDescription( )
{
    String testName =. . . // get current test name
    // open connection to server
    // use the agreed client-server protocol to
```

-continued

Listing 1

```
    // instruct the server to display the description
    // file for test testName
}
```

When the method showTestDescription( ) 128 is invoked by the MIDlet 42 (FIG. 1) operating in a standalone mode, the test harness 16 is not running. The user is responsible for opening the archive file of the package 60 finding and viewing the HTML test descriptor file, using a standard web browser. In this case the code for the method showTestDescription( ) 128 is empty, as shown in Listing 2.

Listing 2

```
public void showTestDescription( )
{
    return;
}
```

The class Runner 126 is provided with other methods to facilitate its operation. A method getAgentProperty( ) 132 retrieves the value of a property of the standalone agent 50 (FIG. 1) including the runtime environment. The value of the agent property is typically returned as a string. However, many other data types could be returned in different embodiments of the method getAgentProperty( ) 132.

A method verbose( ) 134 is provided for writing log and debug messages to a test log. It is generally invoked during the current test to write a test message into the test log, which may be integrated into the report 34 (FIG. 1), or presented on the computing facilities 64 at the conclusion of the current test. The detail of such messages is specified by a parameter verboseLevel 136. In the case where the method verbose( ) 134 is invoked by the MIDlet 42, the verbosity parameter is set during packaging by the generator application 44. Messages can also be printed to a display 138 of the mobile information device 52, or written to a log file if the mobile information device 52 allows it. The method verbose( ) 134 returns the value True if the current test case has been selected for execution, and returns the value False otherwise.

A method getProperty( ) 140 enables retrieval of a property specified for the current test. A parameter key 142 specifies the name of the desired test property. The value of the test property is returned as a string. When the testing framework 10 (FIG. 1) is in use, the method getProperty( ) 140 opens a connection to the communications interface 24 and retrieves a value from the testing framework 10. When used with the standalone agent 50 the method getProperty( ) 140 retrieves the value from the properties file 56.

A method getRunner( ) 144 is a static method, which is used to obtain a reference to the class Runner 126. Only one instance of the class Runner 126 exists at runtime. Once the method getRunner( ) 144 returns the reference, it can be used to invoke methods of the class Runner 126.

There are several methods in the class Runner 126 that perform functions of an administrative nature, and are not generally invoked by executing tests. A method setAgentManager( ) 146 sets a reference to the standalone agent 50 (FIG. 1), as specified by a parameter am 148. A method setCurrentTest( ) 150 sets a current Test reference for the class Runner 126, as specified by a parameter test 152. A method initialize( ) 154 causes the class Runner 126 to reinitialize its internal structure.

A method getRunnerExtender( ) 156 returns an extender object which is used to obtain references to various classes of the standalone agent 50.

A method isSelected( ) 158 enables a test to inquire about the status of a particular test case, specified by a parameter testCase 160. This is useful when a test class has more then one test case, in order to determine which test cases have been selected for execution. Test selection is usually done by the packaging mechanism 54 (FIG. 1). The method isSelected( ) 158 returns the value True if this specified test case has been selected for execution, and returns the value False otherwise.

A method reportCaseTestResult( ) 162 enables a current test to register a test result based on a test case specified by a parameter caseName 164. The test result is specified by a string result 166 in the parameter list of the method reportCaseTestResult( ) 162.

A method resumeTestExecution( ) 168 causes the resumption of test execution after user feedback has been received.

In some embodiments two execution modes may be supported. A test mode involves standard execution of tests. A performance mode measures the execution time of the test and includes this information in the results report. The current embodiment only provides the test mode. However, the following two methods have been implemented, in order that the performance mode can readily be implemented as well. A method setMode( ) 170 defines an execution mode according to a parameter runnerMode 172, which is used to select either the test mode or the performance mode. A method getMode( ) 174 returns the current execution mode of the class Runner 126.

A method pause( ) 176 causes execution of the current test to pause for an interval, measured in milliseconds, as specified by a parameter milliseconds 178. The method pause( ) 176 can be invoked from within the test program.

A method suspendTestExecution( ) 180 causes suspension of test execution in order to obtain user feedback or to await system events. The method suspendTestExecution( ) 180 is particularly useful in interactive tests, in which user validation of results may be required. A parameter timeout 182 specifies a maximum interval during which the test is to be suspended.

In the testing framework 10 (FIG. 1), a conventional mechanism is provided for communication between the mobile information device 12 or the simulation unit 32, and the test harness 16. This is typically implemented as a Java class. A method reportTestResults( ) included in this class reports the results of a test that was run from the test harness 16. The implementation of the method reportTestResults( ) for the testing framework 10 is represented by the pseudocode fragment shown in Listing 3.

Listing 3

```
public void reportTestResult(Test currentTest)
{
    String testName = currentTest.getTestName( );
    String testResult = currentTest.getTestResult( );
    // open connection to server
    // send to server testName, testResult
}
```

In the testing framework 10 (FIG. 1), the test result is displayed to the operator of the test harness 16. When the test executes in standalone mode at the remote site of the user 40, it is displayed on the display 138. If the test is running in an emulation environment, the method reportTestResults( ) can simply print the results in the emulation environment. The method reportTestResults( ) is shown in a pseudocode fragment in Listing 4 according to one implementation in the testing framework 10.

Listing 4

```
public void reportTestResult(Test currentTest)
{
    String testName = currentTest.getTestName( );
    String testResult = currentTest.getTestResult( );
    System.out.println("Test:" + testName +
    ",result:" + result);
}
```

Another implementation of the method reportTestResults( ) is shown in a pseudocode fragment in Listing 5. This implementation is suitable for tests being executed on the mobile information device 52. The test results appear on the display 138.

Listing 5

```
public void reportTestResult(Test currentTest)
{
    String testName = currentTest.getTestName( );
    String testResult = currentTest.getTestResult( );
    // create a new TextBox on the screen and display
    //the result in it
}
```

Client-Server Communication

Referring again to FIG. 1, the properties file 56 that is included in the package 60 includes instructions regarding the order of execution of a test by the mobile information device 52. Using the information in the properties file 56, the mobile information device 52 can execute the MIDlet 42 so as to emulate the test as it was performed using the mobile information device 12 and the test harness 16. The information is read from the properties file 56 during MIDlet execution. The JAR file that is downloaded to the client may contain multiple test cases. Communications differences between the execution of the test on the testing framework 10 and execution of the same test in standalone mode using the mobile information device 52 are now contrasted.

In the case of the testing framework 10, the test harness 16 is running and available for queries. An agent (not shown) running on the client side during test execution queries the test harness 16 via the communications interface 24 over the links 28. A response returned from the communications interface 24 via the links 28 to the mobile information device 12 specifies which test to run next.

In the case of standalone execution, the test harness 16 is not available to the mobile information device 52 during test execution. The standalone agent 50, which is executing on the mobile information device 52, nevertheless needs to know the order in which cases of the test will be run, the test parameters to be used, and other resources to be accessed. To deal with this issue, when the MIDlet 42 and other elements of the package 60 are generated and configured to execute in standalone mode, the generator application 44 adds the properties file 56 to the JAR file that contains the tests. The order in which the tests should be run is specified in the properties file 56. The standalone agent 50 then reads the properties file 56 in order to know which test to run.

Harness User Interface Extension

Continuing to refer to FIG. 1, the test panel extension 22 is provided in the test harness 16 in order to assist in selecting the tests to be carried out by the harness, as well as in preparing the standalone package 60. The test panel extension 22 can be realized by the addition of a test selector and a command button on a screen of the graphical user interface 20. When it has been determined to select a test for standalone operation, pressing the command button results in the generation of a compressed data archive, such as a zip file that contains JAR and JAD files, source files and other necessary resource files, including the properties file 56.

Packaging Mechanism

Continuing to refer to FIG. 1, the package 60 contains resource files 58 in addition to the MIDlet 42, as disclosed hereinabove. The packaging mechanism 54 assembles a modified JAR file as disclosed hereinabove. The packaging mechanism 54 is responsible for locating and packaging all the files that constitute the package 60 in a single zip file, including the JAR, JAD and other relevant files. Typically, a single zip file is created for each individual test of in a test battery. However, it is possible to implement the packaging process so that multiple tests are packaged in each JAR/JAD file. In still other more sophisticated implementations, the user 40 may choose between different compositions of the package 60.

Operation

Figure 5:
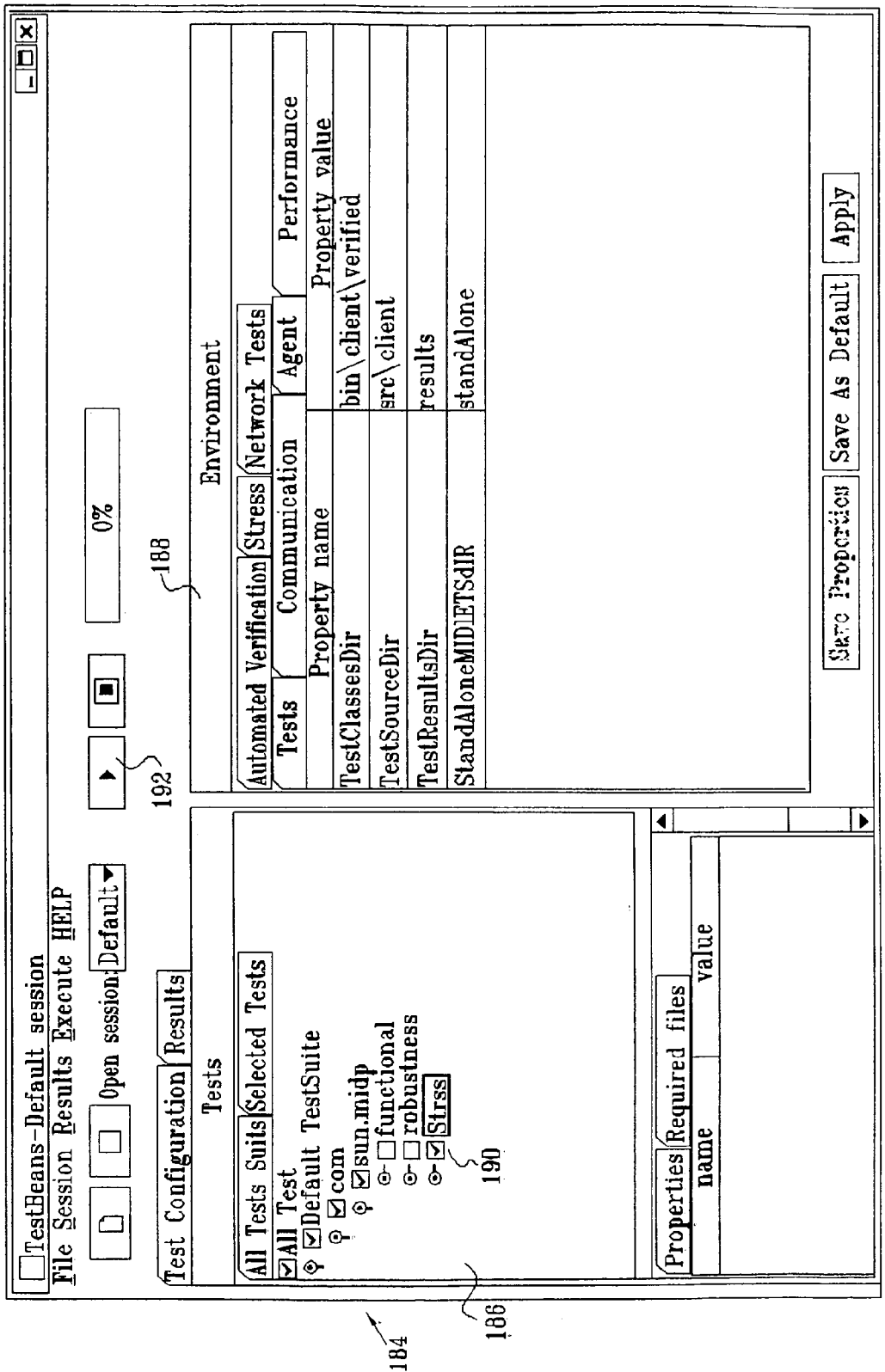
FIG. 5 illustrates a computer screen display for test selection that is generated by the embodiments shown in FIG. 1 in accordance with a disclosed embodiment of the invention.

The disclosure of the operation of the testing framework 10 should be read in conjunction with FIG. 1. Reference is initially made to FIG. 5, which illustrates a computer screen display 184 that is generated by the testing framework 10. A pane 186 at the left of the screen display 184 presents a selection of test procedures, arranged as a hierarchical tree. The user may make a selection of the test procedures to be executed on the mobile information device 52 using the pane 186. A pane 188 presents a tabbed multipage control, which represents the environment settings of the screen display 184. Manipulation of the multipage control in the pane 188 allows the user to configure various test parameters, for instance, the directory in which the tests sources are located, and the web server used for networking tests. Test procedure selection is done by checking and unchecking the text boxes located beside the test/package name. In the example of FIG. 5, a text box 190 is checked, indicating that a test procedure "stress" is to be performed.

To enable test procedures to be run using the testing framework 10 (FIG. 1), the operator 38 clicks on a play button 192 at the top of the screen display 184. This signals the testing framework 10 to start generating JAR files containing the test class files and assembling the other resources required for test execution. The testing framework 10 also starts listening for incoming requests for the MIDlet 42, using the communications interface 24. The operator 38 then has to activate the client, i.e., the platform on which the tests are run, which is the mobile information device 52. The operator 38 activates the wireless environment of the mobile information device 12 and directs the mobile information device 12 to the URL from which the tests can be downloaded. This is the same URL at which a thread of the testing framework 10 is listening for incoming requests.

Figure 6:
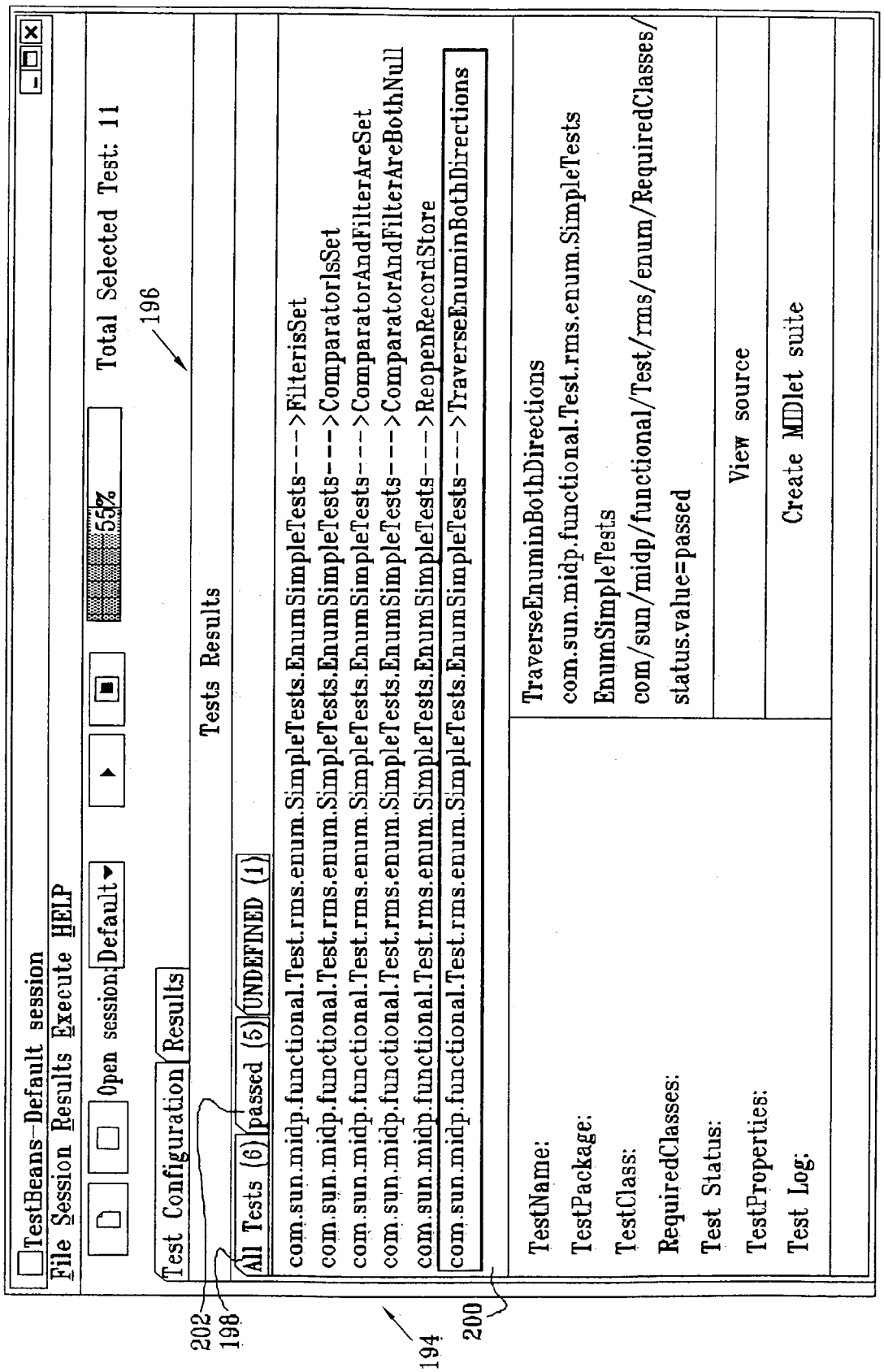
FIG. 6 illustrates a computer screen display of test results with reference to the tests that were selected using the computer screen display shown in FIG. 5 in accordance with a disclosed embodiment of the invention.

Reference is now made to FIG. 6, which illustrates another computer screen display 194 that is generated by the testing framework 10 (FIG. 1). The screen display 194 presents the results of the test cases as a tabbed multipage control 196. On the screen display 194, the operator of the test harness 16 can see how many test procedures were run and what their status is (passed/failed/not run etc.). A tab 198 on the multipage control 196 directs the user to a page 200, which lists the tests that were run. A tab 202 directs the user to a page (not shown), which lists those test procedures that were passed.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

The invention claimed is:

1. A method for testing a computing product, comprising:
running a battery of test programs in a test facility so as to simulate operation of said computing product;
observing that a particular test program in said battery engenders behavior of interest during said simulated operation;
generating a standalone version of said particular test program, which is capable of running on said computing product independently of said test facility;
downloading said standalone version to a development facility; and
executing said particular test program on said computing product at said development facility using said standalone version.

2. The method according to claim 1, wherein executing said particular test program comprises presenting an output of said particular test program using a display at said development facility.

3. The method according to claim 2, wherein said computing product comprises a mobile information device, and wherein said display is integrally a part of said mobile information device.

4. The method according to claim 2, further comprising the steps of:
responsively to said output establishing a modified test condition for said particular test program; and
repeating said step of executing said particular test program using said modified test condition.

5. The method according to claim 1, wherein said particular test program invokes functions of a development application programming interface, and said step of generating a standalone version comprises the steps of:
providing a standalone implementation of said development application programming interface for use by said particular test program; and
downloading said particular test program and said standalone implementation of said development application programing interface to said computing product, wherein said computing product is disposed at a second location.

6. The method according to claim 5, wherein said particular test program comprises a plurality of test cases, further comprising the steps of:
preparing a properties file that specifies an order of execution of said test cases;
downloading said properties file to said computing product; and
executing said test cases on said computing product in said order of execution.

7. The method according to claim 5, wherein said particular test program comprises a plurality of test cases, further comprising the steps of:
encoding an order of execution of said test cases in said particular test program; and
executing said test cases on said computing product in said order of execution.

8. The method according to claim 5, further comprising the steps of:
following performance of said step of executing said particular test program and presenting results thereof;

responsively to said results establishing a modified test condition for said particular test program; and repeating said step of executing said particular test program using said modified test condition.

9. The method according to claim 8, wherein said step of presenting said results is performed using said standalone implementation of said development application programming interface.

10. The method according to claim 5, further comprising the steps of:

following performance of said step of executing said particular test program presenting results thereof;

responsively to said results modifying said particular test program; and thereafter repeating said step of executing said particular test program.

11. The method according to claim 10, wherein said step of presenting said results is performed using said standalone implementation of said development application programming interface.

12. A computer software product, comprising a computer-readable medium in which computer program instructions are stored, which instructions, when read by a computer, cause said computer to perform a method for generating a standalone testing program for a design-under-test comprising the steps of:

at a first location:

running at least a portion of a battery of test programs in a test harness linked to said computer so as to test operation of said design-under-test, said test programs invoking functions of a development application programming interface;

selecting one of said test programs of said battery;

assembling said one of said test programs as a MIDlet that is adapted to be executed on an information device;

providing a standalone implementation of said application programming interface for said MIDlet, said standalone implementation of said application programming interface being an implementation of said development application programming interface that is adapted to said information device; and downloading said MIDlet and said standalone implementation of said application programming interface to said information device, wherein said information device is disposed at a second location.

13. The computer software product according to claim 12, wherein said one of said test programs comprises a plurality of test cases, wherein said instructions further cause said computer to execute the steps of:

at said first location preparing a properties file that specifies an order of execution of said test cases; and downloading said properties file to said information device; wherein said standalone implementation of said application programming interface is adapted to cause said MIDlet to execute said test cases on said information device in said order of execution.

14. The computer software product according to claim 12, wherein said standalone implementation of said application programming interface is adapted to cause said information device to perform the steps of:

following performance of said step of executing said MIDlet displaying results thereof to a user;

thereafter, responsively to an instruction from the user establishing a modified test condition for said MIDlet; and repeating said step of executing said MIDlet using said modified test condition.

15. The computer software product according to claim 12, wherein said standalone implementation of said application programming interface comprises a class that controls an interaction of said MIDlet with a runtime environment thereof.

16. The computer software product according to claim 15, wherein said class comprises a function that returns a description of said one of said test programs.

17. The computer software product according to claim 15, wherein said class comprises a function that returns properties of said runtime environment.

18. The computer software product according to claim 15, wherein said class comprises a function for logging error information relating to said one of said test programs.

19. The computer software product according to claim 15, wherein said class comprises a function that returns a specified property of said one of said test programs.

20. The computer software product according to claim 15, wherein said one of said test programs comprises a plurality of cases, and said class comprises a function that is invoked during performance of said step of executing said MIDlet, said function returning a status of a specified one of said cases.

21. The computer software product according to claim 15, wherein said class comprises a function that registers results of a specified case of said one of said test programs.

22. The computer software product according to claim 15, wherein said class comprises a function that suspends said step of executing said MIDlet.

23. The computer software product according to claim 22, wherein said function suspends said step of executing said MIDlet for a specified interval.

24. The computer software product according to claim 15, wherein said class comprises a function that causes said step of executing said MIDlet to resume following a suspension thereof.

25. The computer software product according to claim 15, wherein said class comprises a function that returns a current execution mode of said class.

26. The computer software product according to claim 15, wherein said class comprises a function that displays results of said one of said test programs.

27. A data processing system for generating a standalone test program for an information device, wherein said test program invokes functions of a development application programming interface, comprising:

a computer readable memory having a data structure stored therein, said data structure including a standalone implementation of said application programming interface for executing said test program in a standalone mode of operation, wherein said standalone implementation of said application programming interface is an implementation of said development application programming interface that is adapted to enable said information device to perform the steps of:

executing said test program in said standalone mode of operation; and thereafter presenting test results to a user, wherein said standalone implementation of said application programming interface comprises a class that controls an interaction of said test program with a runtime environment thereof.

28. The data processing system according to claim 27, wherein said class comprises a function that returns a description of a test case of said test program.

29. The data processing system according to claim 27, wherein said class comprises a function that returns properties of said runtime environment.

30. The data processing system according to claim 27, wherein said class comprises a function for logging error information relating to said test program.

31. The data processing system according to claim 27, wherein said class comprises a function that returns a specified property of a test case of said test program.

32. The data processing system according to claim 27, wherein said test program comprises a plurality of test cases, and said class comprises a function that is invoked during performance of said step of executing said test program, said function returning a status of a specified one of said test cases.

33. The data processing system according to claim 27, wherein said test program comprises a plurality of test cases, and said class comprises a function that registers results of a specified one of said test cases.

34. The data processing system according to claim 27, wherein said class comprises a function that suspends said step of executing said test program.

35. The data processing system according to claim 34, wherein said function suspends said step of executing said test program for a specified interval.

36. The data processing system according to claim 27, wherein said class comprises a function that causes said step of executing said test program to resume following a suspension thereof.

37. The data processing system according to claim 27, wherein said class comprises a function that returns a current execution mode of said class.

38. The data processing system according to claim 27, wherein said class comprises a function that displays results of said test program following execution thereof on said information device.

39. A computer-implemented test harness, comprising:
a first application programming interface;
a test selection module, accessible via said first application programing interface;
a local test execution module, for testing a design-under-test responsively to said test selection module;
an application generator adapted to generate an executable program for conducting selected tests on a remote device, said application generator being responsive to said first application programming interface, said selected tests being chosen responsively to results of said local test execution module, and said selected tests invoking functions of a development application programing interface;
a persistent storage having a data structure resident therein, said data structure comprising a second implementation of said development application programming interface, said second implementation of said development application programming interface being an implementation of said development application programming interface that is adapted to said remote device, wherein an order of test execution is obtained for at least one test procedure via said test selection module and said first application programming interface; and
a packaging module, adapted to assemble said program, and said data structure into a download package for transmission to said remote device, said download package being configured for standalone execution of said program on said remote device according to directions received from a user via said second implementation of said development application programming interface.

40. The computer-implemented test harness according to claim 39, wherein said local test execution module comprises a simulation unit.

41. The computer-implemented test harness according to claim 39, wherein said local test execution module comprises a link to another remote device, said another remote device being identical to said remote device.

42. The computer-implemented test harness according to claim 39, wherein said design-under-test comprises software adapted to execute on said remote device.

43. The computer-implemented test harness according to claim 39, wherein said design-under-test comprises at least a portion of said remote device.

44. The computer-implemented test harness according to claim 39, wherein said download package comprises a JAR file.

45. The computer-implemented test harness according to claim 39, wherein said download package is a zip file.

46. The computer-implemented test harness according to claim 39, further comprising a server for a data network that is initially accessible by said remote device, said application generator and said persistent storage being disposed in said server.

47. The computer-implemented test harness according to claim 39, wherein said second implementation of said development application programming interface comprises a class that controls an interaction of said program with a runtime environment thereof.

48. The computer-implemented test harness according to claim 47, wherein said class comprises a function that returns a description of said test procedure.

49. The computer-implemented test harness according to claim 47, wherein said class comprises a function that returns properties of said runtime environment.

50. The computer-implemented test harness according to claim 47, wherein said class comprises a function for logging error information relating to said test procedure.

51. The computer-implemented test harness according to claim 47, wherein said class comprises a function that returns a specified property of said test procedure.

52. The computer-implemented test harness according to claim 47, wherein said test procedure comprises a plurality of cases, and said class comprises a function that is invoked while executing said program on said remote device, said function returning a status of a specified one of said cases.

53. The computer-implemented test harness according to claim 47, wherein said class comprises a function that registers results of a specified case of said test procedure.

54. The computer-implemented test harness according to claim 47, wherein said class comprises a function that suspends execution of said program on said remote device.

55. The computer-implemented test harness according to claim 54, wherein said function suspends execution of said program on said remote device for a specified interval.

56. The computer-implemented test harness according to claim 47, wherein said class comprises a function that causes a resumption of execution of said program on said remote device following a suspension thereof.

57. The computer-implemented test harness according to claim 47, wherein said class comprises a function that returns a current execution mode of said class.

58. The computer-implemented test harness according to claim 47, wherein said class comprises a function that displays results of said test procedure.

* * * * *